United States Patent [19]

Erickson et al.

[11] Patent Number: 4,534,828
[45] Date of Patent: Aug. 13, 1985

[54] EVAPORATOR APPARATUS

[75] Inventors: Dale C. Erickson, St. Paul; Norton J. Erickson, New Brighton, both of Minn.

[73] Assignee: Nordale Incorporated, Blane, Minn.

[21] Appl. No.: 537,976

[22] Filed: Sep. 30, 1983

Related U.S. Application Data

[63] Continuation-in-part of Ser. No. 310,649, Oct. 13, 1981, abandoned.

[51] Int. Cl.³ .................. B01D 1/04; C02F 1/04
[52] U.S. Cl. .................... 159/16.1; 159/26.1; 159/28.1; 159/40; 159/42; 202/176; 202/182; 202/206; 202/235; 203/1; 203/2; 203/49; 203/100; 203/DIG. 25; 203/DIG. 14
[58] Field of Search .......... 203/10, 11, 49, 18, 203/100, DIG. 17, DIG. 14, DIG. 7, 1, 2, DIG. 25; 202/235, 234, 206, 176, 175, 182, 205; 159/42, 16 R, 40, 28 R, 16 A; 261/119 R

[56] References Cited

U.S. PATENT DOCUMENTS

| | | |
|---|---|---|
| 53,226 | 3/1866 | Kohly, Jr. . |
| 324,683 | 8/1885 | Groesbeck et al. . |
| 1,493,756 | 5/1924 | LaBour .................. 203/90 |
| 1,561,898 | 11/1925 | Antisell . |
| 3,011,956 | 12/1961 | Smith et al. . |
| 3,347,755 | 10/1967 | Brooks . |
| 3,450,603 | 6/1969 | Meyers et al. . |
| 3,565,767 | 2/1971 | Light .................. 203/49 X |
| 3,642,583 | 2/1972 | Greenberg et al. .......... 203/49 X |
| 3,841,382 | 10/1974 | Gravis, III et al. . |
| 3,891,510 | 6/1975 | Drostholm et al. . |
| 3,933,600 | 1/1976 | Dodge et al. .............. 203/49 X |
| 4,096,039 | 6/1978 | Carnine et al. . |
| 4,110,172 | 8/1978 | Spears .................... 203/49 X |
| 4,200,497 | 4/1980 | Rhodes ................... 203/49 X |
| 4,210,494 | 7/1980 | Rhodes ................... 203/49 X |
| 4,269,663 | 5/1981 | McFee . |

Primary Examiner—Wilbur Bascomb
Attorney, Agent, or Firm—Merchant, Gould, Smith, Edell, Welter & Schmidt

[57] ABSTRACT

An evaporator apparatus (10) and method for converting a contaminated fluid including mostly water and water soluble substances into a vapor and a residue. Apparatus (10) includes a container (11) for retaining the fluid. A heat source (17) is utilized for supplying heat to evaporate the fluid. A flue assembly (18) positioned in the fluid conveys the heat from the heat source (17) through the fluid. A draft mechanism (20) draws off the resulting vapors as they are formed.

6 Claims, 5 Drawing Figures

EVAPORATOR APPARATUS

This is a continuation-in-part application of Ser. No. 310,649 filed Oct. 13, 1981 and now abandoned.

TECHNICAL FIELD

The present invention relates to an apparatus for evaporating a fluid containing water and water soluble and insoluble substances to an environmentally safe vapor. More particularly, the present invention relates to an air assisted evaporator which separates a water and machine coolant mixture into a vapor and a residue.

BACKGROUND OF THE INVENTION

Industry makes extensive use of fluids containing mostly water and water soluble machine coolants to continuously or periodically cool tools or equipment which have a tendency to become heated during normal operation. The fluids after a period of use often become contaminated with various water soluble and insoluble substances such as filings, tramp oils, etc. The contaminated fluids are then no longer useful as they lose effectiveness and may damage various working machine parts.

Current anti-pollution laws require that these contaminated fluid wastes be dumped at designated regional waste disposal sites so not to pollute the environment. Oftentimes the designated waste disposal sites are substantial distances from the user site. In addition, precautions must be taken to ship the contaminated waste in a safe manner. Compliance with the laws is very expensive as frequently there are large amounts of waste to be shipped.

Therefore, devices have been built in an attempt to recycle and reduce the volume of contaminated waste. Devices are known which heat contaminated fluid to the boiling point to evaporate the water and the water soluble substances contained therein into an environmentally safe vapor which is then vented into the atmosphere.

Fluid eliminators currently utilized have associated various problems. Present eliminators commonly use a heat source located directly beneath the container. As a result, the liner of the container becomes very hot since it serves as the medium for conducting the heat to the contaminated fluid. Furthermore, most contaminated fluids contain non-soluble substances which settle out of the fluid during the heating process. The non-soluble substances deposit on the bottom of the container and serve as an insulating layer for preventing the conductance of heat from the container bottom to the fluid. This reduces overall efficiency of the device. In addition, the settlings are difficult to clean from the bottom of the container as they become caked or baked onto the surface.

Another hazard related to present eliminators is the tendency to emit harmful fumes. It is very important that a proper draft be maintained at all times to draw off any and all fumes created as a result of the evaporation process.

Present eliminators tend to be bulky and cumbersome in size thereby requiring a significant amount of space for operation. This creates problems for a small shop or operator where floor space is at a premium. Often a special, extra heavy electrical feed is required or special fuels are necessary, imposing a further burden on the small operator.

Some fluid eliminators utilize centrifugal force as a means to separate out the tramp oils and other various contaminants from the fluid. However, with such eliminators, the bacteria which may be thriving in the contaminated fluid is not killed since no heat is applied during the process. This can create a significant health problem since many people are allergic to the bacteria which thrive in the contaminated fluid.

The present invention overcomes these problems by use of a novel air assisted evaporator which utilizes a unique flue structure to assure efficient heating of the fluid in addition to other advantageous features.

SUMMARY OF THE INVENTION

The present invention relates to an apparatus for converting a liquid of mostly water contaminated with water insoluble substances into a less contaminated vapor. The apparatus includes a container for holding the liquid and a mechanism within the container for heating the liquid. The apparatus further includes mechanism for mixing air with vapor formed from the evaporation of the heated liquid. The mixing mechanism includes mechanism for directing a flow of air along the top surface of the liquid so as to replace saturated air with unsaturated air thereby enhancing vaporization. The apparatus also includes mechanism attached to the container for exhausting the air and the vapor from the container. The exhausting mechanism has a fan for drawing air through the directing mechanism to mix with the vapor and exhaust mixture.

The present invention further relates to a method for converting a liquid of water contaminated with water insoluble substances into a less contaminated vapor. The method includes the steps of placing the liquid in an enclosed container, heating the liquid with heating mechanism so that the water boils, and skimming off the insoluble substances floating on top of the water into a trough at a side of the container. This method further includes directing unsaturated air from outside the container along the surface of the liquid to mix the unsaturated air with vapor rising from the boiling water and drawing and exhausting the mixture of air and vapor into the atmosphere on the outside of the container. An additional embodiment of the method includes a step of mixing the air and vapor mixture with flue gases from the heating means. Yet another additional embodiment includes sensing the temperature of the liquid at a location in the container a short distance above the heating mechanism and turning off the heating mechanism when a predetermined temperature is sensed thereby preventing higher temperature insoluble substances from contacting the heating mechanism and possibly igniting.

The present invention is particularly advantageous because it converts contaminated fluids into a less contaminated vapor in a straightforward and efficient manner. The present invention does away with the problems associated with "under-firing" by removing the heat source from under the container containing the fluid and conveying the heat through the fluid by a flue structure positioned in the fluid. The problem of settlings at the bottom of the container insulating the container from the heat source positioned beneath the container is done away with since the flue structure is positioned above the bottom of the container. The efficiency of the apparatus is therefore maintained between periodic cleaning intervals. In addition, the container is easier to clean because the settlings do not become baked onto the bottom of the container. A drain plug near the bottom of the container also enables the fluid to be readily drained from the container if so desired. To aid in removing settlings, the bottom of the container may be slanted toward the drain plug.

The flue structure is positioned in the container so as to assure efficient heating of the fluid. This is accomplished by allowing sufficient clearance about the circumference of the flue portions between adjacent flue portions and the sides and bottom of the container. The flues are of such a length and diameter as to enable efficient heating thereof by conventional inshot heaters or other suitable heater devices.

Many other types of apparatus such as centrifugal devices have attempted to separate contaminated substances from fluid through the non-application of heat. However, an advantage with applying heat to the contaminated fluid is that bacteria frequently thriving in such fluids is killed, thereby doing away with a health hazard.

A further advantage of the present invention is its relatively odor-free operation. The present invention has an air inlet to enable the flow of fresh air through the container to assist in more thorough vaporization of the fluid and removal of all odors. In addition, the floating damper mechanism of the present invention causes the air to flow adjacent the surface of the fluid to assure adequate mixing of air and vapors. The air inlet and damper mechanism assure that no dangerous vapors or fumes will back up into the room when the venting mechanism is switched off.

In one embodiment of the present invention, mechanism is provided to allow tramp oils to be skimmed off the surface of the fluid periodically. The tramp oils can then be drained off in a highly concentrated form and utilized in commercial furnaces. This does away with the need to ship large amounts of fluid to waste disposal sites and creates an energy source for large commercial furnaces.

The present invention is relatively easy to maintain due to its relatively few working parts. In addition, the present invention is relatively inexpensive.

Yet another feature of the present invention is its portability. All the working parts are contained on one framework having a relatively small size. This enables easy setup and location generally wherever desired.

A major advantage, however, of the present invention is its safety features. The present invention utilizes a blower mechanism to draw off all the vapors and odors generated during the evaporation process. Should the main blower assembly go out, the present invention is designed to switch the burner off. The draft is monitored by a sensor mechanism so that if the blower assembly is not creating sufficient draft or suction the burner assembly is shut off. In addition, there is a fluid low limit switch which senses when the contaminated fluid is too low in the tank at which time the burners are once again switched off while the main fan keeps on operating. Also, a temperature sensor just above the heating mechanism is interconnected with shutoff mechanism for the heating mechanism to turn off the heating mechanism when a predetermined temperature is sensed. Thus, ignitable insoluble substances may be kept from contacting the heating mechanism. Additionally, as mentioned previously, the present invention kills bacteria thereby doing away with a potential health problem. The draft system of the present invention in conjunction with the flow of fresh air and the floating baffle mechanism assures that no hazardous odors will infiltrate into the surrounding area thereby creating a health problem. Because the heating mechanism of the present invention is enclosed thereby not exposing flames to any potential odors or spillage, the present invention is relatively safe from fire or explosion.

The present invention is very efficient in its performance while meeting air quality standards thereby avoiding the need for shipping large volumes of contaminated fluids to waste disposal sites. The present invention accomplishes this while utilizing 110-volt electrical circuits and conventional gas-fueled furnaces.

These and other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE INVENTION

Figure 1:
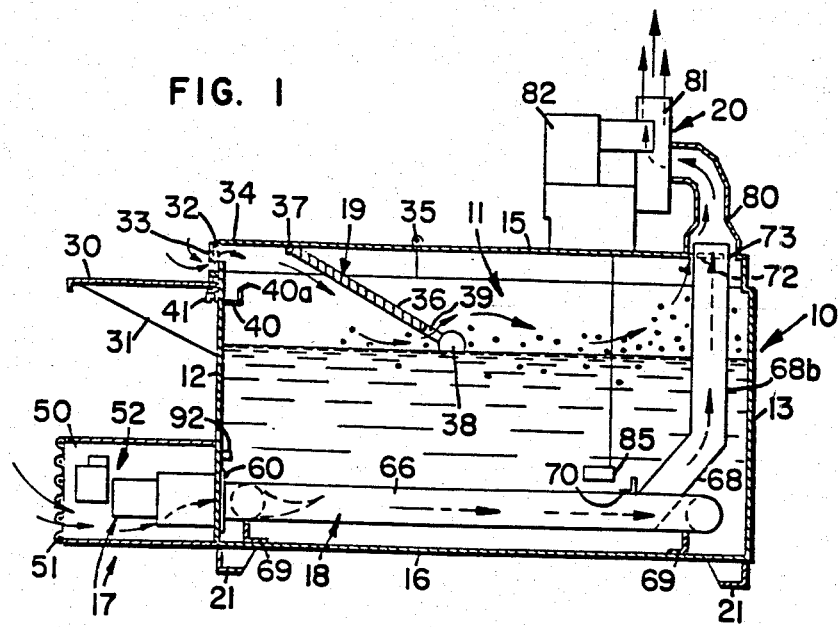
FIG. 1 is a side elevational view of the present invention.

Referring now to the drawings, there is shown in FIG. 1 a preferred embodiment of an evaporator apparatus 10 in accordance with the present invention. Evaporator apparatus 10 includes an enclosed rectangular container or tank 11 for holding fluid. Tank 11 has a front end 12, a back end 13, two side walls 14a and 14b, a top member 15, and a bottom member 16. A heater 17 for supplying heat is positioned adjacent front end 12. A flue assembly 18 for conveying heat through the fluid in tank 11 is positioned near bottom member 16 of tank 11. A floating baffle mechanism 19 which prevents the backup of odors and fumes is attached to top member 15 of tank 11. Positioned near back end 13 is a venting mechanism 20 for venting off vapors and fumes.

Tank 11 is supported above the surface of the floor by supports 21 suitably attached to bottom 16 and located adjacent back end 13 and front end 12. Tank 11 may be made of insulated steel or otherwise suitably insulated to retain the heat. Although a rectangular configuration is shown, any suitable tank configuration may be utilized. Tank 11 is suitably sealed to prevent leaking.

A flat horizontal shelf 30 is attached to front end 12 near top portion 15. Shelf 30 is supported by two tapered vertically extending braces 31 and serves as a protection shield for heater 17 positioned below.

Tank 11 has a hinged access lid 34 adjacent the front end of top portion 15. Hinged access lid 34 is pivotal about a horizontally, traversely extending hinge 35 suitably attached to top 15 of tank 11. Hinged access lid 34 provides access to tank 11 such that fluids can be placed therein. Tank 11 further has an air inlet 32 located adjacent front end 12 in access lid 34 above shelf 30. Air inlet 32 is formed by a rectangular extending member 33 having an opening in the bottom thereof. Air inlet 32 enables fresh room air to flow into the interior of tank 11. Fresh air is able to circulate into and through tank 11 such that all the vapors and fumes are drawn off by venting mechanism 20. Thus when the evaporation process is stopped all remaining fumes or vapors trapped inside tank 11 are removed due to the circulation of fresh air through tank 11.

Baffle mechanism 19 is attached to the bottom of hinged access lid 34. Baffle mechanism 19 includes a rectangular baffle plate 36 extending substantially the width of tank 11. Plate 36 is attached to the bottom of lid 34 by a horizontally transversely extending hinge 37 which enables baffle plate 36 to pivot thereabout. Fixedly attached to the opposite end of baffle plate 36 is a cylindrical float 38. Float 38 enables baffle plate 36 to be suspended above the surface of the fluid. Adjacent float 38 in baffle member 36 is an aperture 39 which forms a passageway for the flow of air therethrough. Aperture 39 is positioned adjacent float 38 such that the air is forced to flow adjacent the surface of the fluid thereby efficiently mixing nonsaturated air with air saturated or nearly saturated with the vapors of the fluid.

A skimmer bar or trough 40 is positioned on the inside of tank 11 suitably attached to front end 12. Skimmer bar 40 may be a suitable piece of angle iron which extends horizontally the width of tank 11 along front end 12. Positioned adjacent skimmer bar 40 is a drain or cell cock 41 for draining off fluid trapped or contained by skimmer bar 40. Tramp oils and the like rise to the surface of the fluid as the fluid is heated. When the tramp oils rise to a level above that of skimmer bar 40, the tramp oils will flow over the top edge 40a of skimmer bar 40. If drain 41 is open, the tramp oils will drain out of container 11. The tramp oils may be drained into any suitable receptacle or drain line.

In front end 12 near bottom 16 is a drainpipe 42. Drainpipe 42 may be suitable drain mechanism that enables draining of the fluid from tank 11. Bottom 16 may be slanted from a plurality of sides to better drain liquid and settlings to drain pipe 42.

Positioned adjacent front end 12 on the outside of tank 11 is heater 17. Heater 17 is enclosed in a burner shield assembly 50. Burner shield assembly 50 contains a perforated member 51 at the front end thereof. Perforated member 51 may be a perforated metal screen or any such suitable member. Positioned inside burner shield assembly 50 is a conventional burner assembly 52. Burner assembly 52 is interconnected to flue structure 18 by a suitable adapter apparatus. Burner assembly 52 is preferably an inshot gas burner controlled by a solenoid 54 illustrated schematically in FIG. 4.

Figure 2:
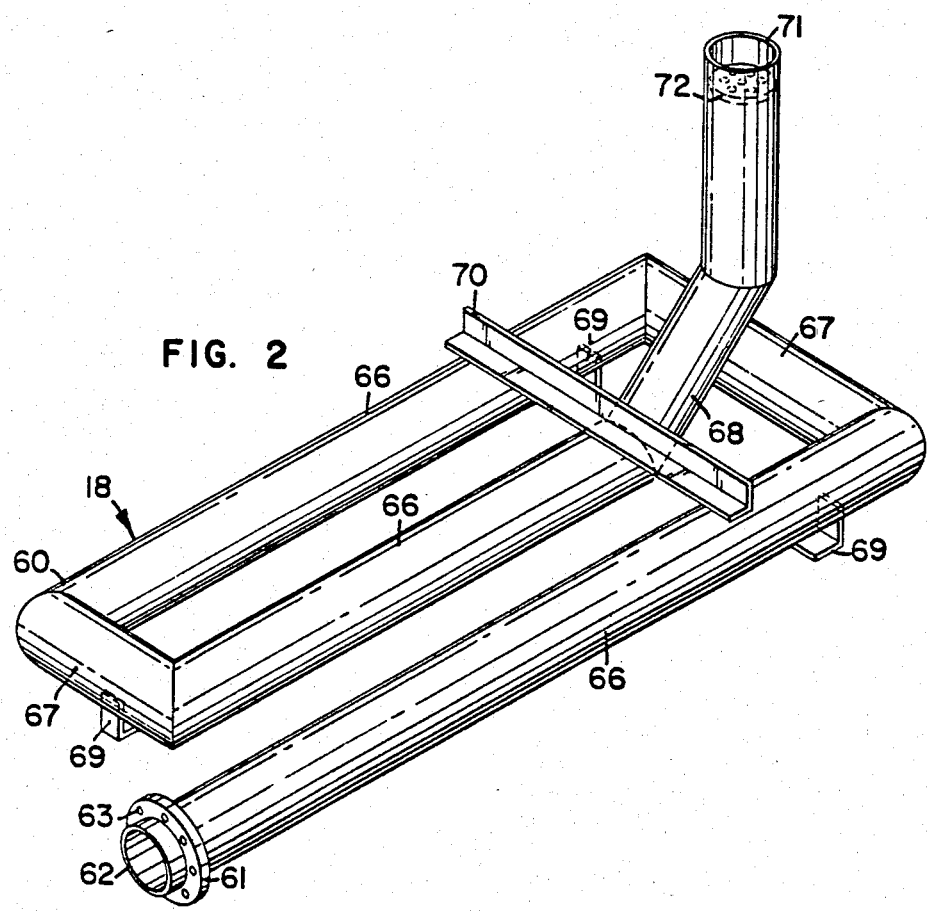
FIG. 2 is a view in perspective of the flue structure.

Flue assembly 18 as shown in FIG. 2 includes an elongated flue portion 60, supports 69, and centralizing bar 70. Flue 60 has a heat entrance end 62 and a heat exit end 71. Flue 60 provides an enclosed passageway for directing heat through the fluid. Flue 60 is shown as being a generally tubular conduit or fire tube having a flanged collar 61 about the circumference thereof near heat entrance end 62. Flange collar 61 has tapped apertures 63 about the circumference thereof for reception of nut and bolt assemblies. Flange collar 61 is offset from heat entrance end 62 such that heat entrance end 62 of flue 60 extends through and slightly beyond front end 12 of tank 11 or the outside thereof. Flange collar 61 is utilized to suitably connect entrance end 62 with burner 52.

Figure 3:
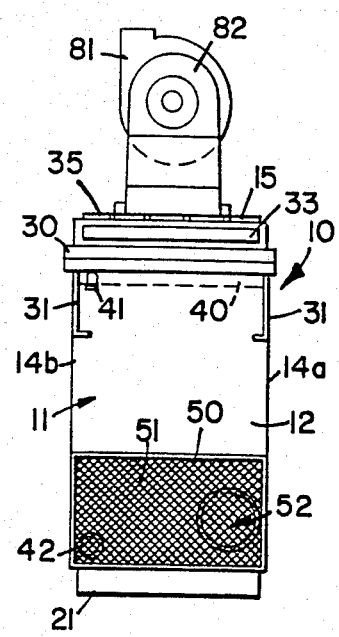
FIG. 3 is a front view.

As shown in FIGS. 1 and 3, it is preferable that in the embodiment shown heat entrance end 62 of flue 60 be attached to front end 12 of tank 11 near bottom 16 and near side wall 14 of tank 11. Heat entrance end 62 and heat exit end 71 are at opposite ends of tank 11 in the preferred embodiment. It is understood, however, that flue 60 may assume a variety of configurations and, consequently, may be attached at various locations to tank 11.

As shown, flue 60 includes several flue segments which form a grid-like structure. Flue 60 may be one integral flue suitably bent so as to form the desired configuration or flue 60 may include individual sections suitably connected. As shown in FIG. 2, flue 60 includes three segments 66 extending generally parallel to side walls 14a, b substantially the length of tank 11. Segments 66 are suitably welded at the ends thereof to segments 67 which extend generally parallel to front end 12. Segments 66 and 67 lie generally in a plane parallel to bottom 16 of tank 11. A segment 68 is suitably welded to the end of middle segment 66 and extends generally vertically upward to top 15 of tank 11.

Segment 68 extends vertically upward to a location slightly above top 15 of tank 11 such that heat exit end 71 is positioned slightly above top 15 of tank 11. Exit end 71 projects through an opening 73 in top 15 of tank 11 which has a larger diameter than the outer diameter of flue 60 such that an annular opening is formed.

Flue 60 has a large inside diameter to allow gases to exhaust from burner assembly 52. In addition, flue 60 is of sufficient length to enable efficient and thorough heating of the fluid. Segments 66, 67 of flue 60 are positioned so as to allow fluid to circulate about the circumference thereof. The exact dimensions and configuration of flue 60 may vary depending on such factors as tank 11 size, heater 17 utilized, temperature requirements, the particular application, etc.

Flue portion 60 is supported above bottom portion 16 of tank 11 by three supports or pods 69 attached to bottom 16. Supports 69 maintain a proper spacing between flue 60 and bottom 16 of tank 11, so that settlings settle to bottom 16 beneath flue 60 and thereby do not serve as an insulating layer between heat source 17 and the fluid. Also, the settlings do not become caked onto bottom 16 of tank 11. Attached to the top portion of segments 66 near back end 13 is a centralizing bar 70. Centralizing bar 70 is a piece of angle iron which extends generally parallel front end 12 approximately the width of tank 11. Centralizing bar 70 maintains the relative position of flue portion 60. Supports 69 and centralizing bar 70 are attached to flue 60 in any suitable fashion.

Disposed in the interior of flue 60 near heat exit end 71 of flue 60 is a fixed damper 72 horizontally mounted in segment 68. Fixed damper 72 is a plate having a generally horizontally orientation and further having apertures therein to allow a predetermined amount of draft. This prevents the pilot light of burner assembly 72 from going out due to excessive draft and provides for efficient flow of air by avoiding an excessive amount of air being drawn through flue portion 60, thereby resulting in insufficient heating of flue 60.

Venting mechanism 20 includes a draft diverter 80 suitably attached to top portion 15 of tank 11 over opening 73 so as to enclose heat exit end 71 and opening 73. Draft diverter 80 is a generally hollow conduit structure providing a passageway for said fumes. As indicated previously, draft diverter 80 has a larger diameter than flue 60 at the end where draft diverter 80 is connected with top 15 of tank 11, thereby providing a passageway for the air and vapor to exit from tank 11 by providing an annular space between heat exit end 71 and draft diverter 80. This enables the mixing of vapors and air with the heated gases being emitted from heat exit end 71 which projects slightly above top 15 of tank 11 into the interior of draft diverter 80. Draft diverter 80 is suitably interconnected to a stack or vent adapter 81. Stack or vent adapter 81 allows connection of a vent for venting the vapors to the outside of the building. A blower assembly 82 including an updraft fan is suitably interconnected with vent adapter 81 so as to create a proper updraft flow.

Figure 5:
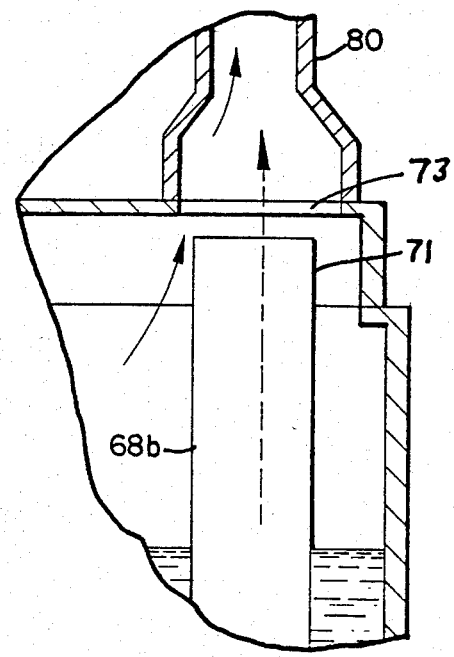
FIG. 5 is a detail view of an embodiment of the invention having the end of the flue beneath the exhaust vent.

Alternatively, as shown in FIG. 5, the exit end 71 of flue 60 may be located beneath opening 73 to draft diverter or vent 80. Flue gases are emitted with some velocity from end 71 and flow into vent 80 and in doing so aspirate vapor laden air through the space between end 71 and the edge of opening 73.

Figure 4:
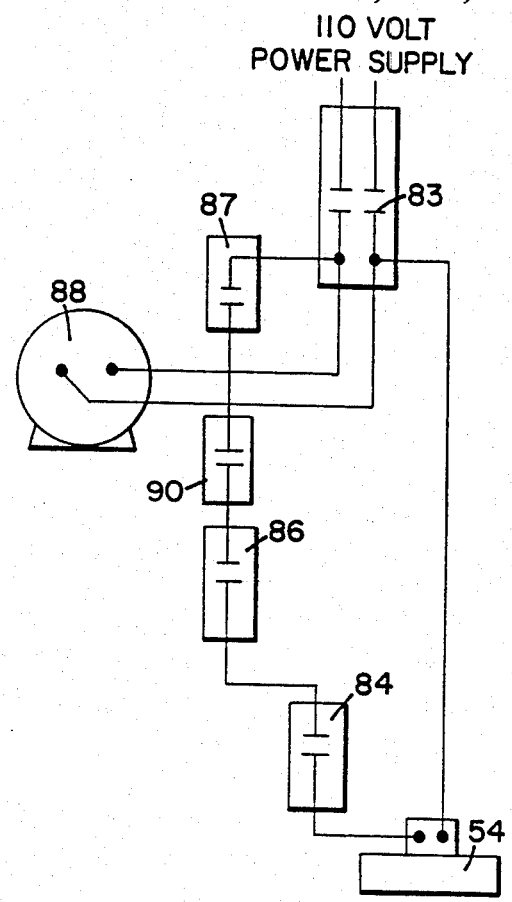
FIG. 4 is a schematic wiring diagram of the present invention.

As illustrated in the schematic wiring diagram of FIG. 4, various controls are provided for safe and efficient operation of the present invention. A conventional 110-volt power supply may be used since the blower assembly 82 and burner assembly 52 do not require substantial power amounts. A main switch 83 is utilized to turn off and on the operation of a fan motor 88 of blower assembly 82. Constant sensing of the updraft flow is made so that if nonsufficient flow is detected, burner assembly 52 is switched off by an automatic vacuum air switch 84. Constant sensing of the fluid level is also made by utilizing a float 85 suitably suspended in tank 11. If a low condition is detected, a fluid low limit switch 86 turns off the burner assembly.

Also, a temperature sensor 92 is located preferably just above the heat entrance end 62 of flue 60. Sensor 92 is connected to switch 90 in order to turn off burner assembly 52 whenever a predetermined temperature is sensed. Ordinarily sensor 92 is located in boiling water and senses a rather constant temperature. It is understood that sensor 92 could as well be a surface sensor located on a wall of tank 11 external of tank 11. Tramp oils floating on the water are ordinarily heated to a temperature somewhat higher than the boiling water. If a large quantity of tramp oil is present, it may contact sensor 92. The predetermined temperature will then likely be sensed and the burner assembly shut down. This feature then protects against possible excessive heating and ignition of the tramp oils.

In addition, a burner switch 87 is utilized to turn off and on a gas solenoid 54 of burner assembly 52. If the main switch is not on, the burner switch 52 will not turn on even though the burner switch is turned on. Note that, as shown in FIG. 4, the switches are wired in series such that if the main switch is not turned on or if an abnormality is detected solenoid 54 of burner assembly 52 will be switched off, thereby providing for safe operation.

In operation, tank 11 is filled with any suitable fluid by opening hinged axis lid 34 and pouring fluid into tank 11. Acceptable fluids for processing include but are not limited to water soluble machine coolants of either a petroleum or synthetic base. This further includes water miscible cutting and grinding fluids.

Main switch 83 is switched off while pouring fluid into tank 11. Tank 11 is filled to a level or height which does not exceed the bottom of skimmer bar 40. This prevents overflow of fluid during operation as the fluid has a tendency to expand. However, sufficient fluid must be poured into tank 11 such that there is a sufficient layer of fluid over flue 60. If the level of the fluid is not high enough in tank 11, low limit switch 86 will not permit burner assembly 52 to turn on.

After placing sufficient fluid in tank 11, hinged axis lid 34 is closed. Main switch 83 is then turned on and blower assembly 82 starts operation. Burner assembly 52 is then turned on. Air is drawn in through air inlet 32 and along with the vapors and hot gases is drawn through venting mechanism 20. Venting mechanism 20 thereby assures an updraft for drawing off vapors generated during the operation.

The air drawn in through air inlet 32 in access lid 34 mixes with the resulting vapors as the air is forced close to the surface of the fluid by baffle mechanism 19. Aperture 39 in baffle plate 36 allows the room air to flow from front end 12 through baffle plate 36 adjacent the surface of the fluid. The air mixes with the vapors thereby assuring efficient and thorough evaporation. The air and vapors then mix with the hot gases exiting from heat exit end 71 of flue 60 adjacent draft diverter 80. The vapors are further reduced and the combined mixture of hot gases, air, and vapors are drawn off into the atmosphere by blower assembly 82 through the vent attached to vent adapter 81.

During the operation of the evaporator apparatus 10, there may be a periodic build-up of tramp oil on the fluid surface. When the build-up becomes undesirably large, it can be removed with the skimmer bar 40 and drain 41 located at front end 12 near top 15 of tank 11. Skimmer drain 41 may be opened as necessary when the fluid begins to expand shortly after startup.

Periodically during normal operation, all the nonevaporated liquid should be drained from tank 11 by drain pipe 42 located at front end 12 near bottom 16 of tank 11. Tank 11 is then flushed clean with water. Any further sediment such as metal filings are also removed at this time. In addition to the periodic cleaning, tank 11 should be cleaned whenever the bottom sediment reaches a substantial thickness.

The present invention enables efficient operation due to its structural and functional features detailed in the foregoing description. However, the disclosure is illustrative only, and changes may be made in detail, especially in matters of shape, size and arrangement of parts within the principle of the invention, to the full extent indicated by the broad general meaning of the terms in which the appended claims are expressed.

We claim:

1. An apparatus for converting a liquid of mostly water contaminated with water soluble and insoluble substances into a less contaminated vapor, comprising:
   (a) a container for holding said liquid, said container having a bottom and a top portion, said liquid having a top surface;
   (b) means positioned in said container for heating said liquid in said container, whereby vapor is formed from the evaporation of said liquid;
   (c) means attached to said container for mixing air with said vapor, said mixing means including a first opening in the top portion of said container and means for directing a flow of air along the top surface of said liquid thereby replacing saturated air with unsaturated air to enhance vaporization, said directing means including a floating baffle attached to the top portion of said container, said baffle having a second opening therethrough; and (d) means attached to said container for exhausting said air and said vapor from said container, said exhausting means including a fan for drawing air passed said directing means to mix with the vapor and exhaust the mixture.

2. An apparatus for converting a contaminated liquid of mostly water into a less contaminated vapor, comprising:

(a) a container for holding said liquid, said container having a bottom and a top and first and second ends, said liquid having a top surface;

(b) flue means for conveying heat through said liquid in said container, said flue means being positioned in said container near said bottom so as to be positioned in said liquid, said flue means having first and second ends;

(c) means attached to said container for supplying heat to said flue means, said flue means being interconnected at said first end with said heat supplying means, said heat supplying means causing said flue means to heat said liquid to enhance vaporization;

(d) means for mixing said vapor created by the evaporation of said liquid with air, said mixing means including an aperture in said container, said aperture allowing the flow of air from outside said container into the inside of said container; and (e) means attached to said container for drawing and exhausting said vapor and air from the inside of said container, said drawing and exhaust means including a vent structure having a generally hollow interior, said vent structure being suitably connected to said container so as to define a passageway from said container to the atmosphere, said second end to said flue means being disposed near said passageway defined by said vent structure, said passageway having a larger diameter than said flue means so as to define a space between said passageway and the second end of said flue means, whereby said vapor and said fresh air are aspirated into said passageway through said space and mixed with the hot gases being emitted from said second end of said flue means toward said passageway, thereby further diluting said vapor.

3. Apparatus in accordance with claim 2 wherein the second end of said flue means projects into the passageway defined by said vent structure.

4. An apparatus in accordance with claim 2 wherein said mixing means includes means for directing said flow of air along the top surface of said liquid thereby replacing saturated air with unsaturated air to further enhance vaporization.

5. An apparatus in accordance with claim 4 wherein said directing means includes a baffle mechanism, said baffle mechanism including a baffle plate having first and second ends, said baffle plate pivotally connected at said first end to the top portion of said container, said baffle plate having a float attached to said second end thereof, said baffle plate having an aperture adjacent to said second end for allowing the passage of air therethrough, said baffle mechanism forcing said air to flow adjacent the surface of said liquid, whereby the mixing of said air with said vapor is increased.

6. An apparatus for converting a liquid of mostly water which is contaminated with water insoluble substances into a less contaminated vapor, comprising:

a container for holding said liquid, said container having a bottom and a top and first and second ends, said liquid having a top surface;

flue means for conveying heat through said liquid in said container, said flue means being positioned in said container near said bottom so as to be positioned in said liquid, said flue means having first and second ends, the first end of said flue means being near the first end of said container and the second end of said flue means being near the second end of the container;

means attached to said container for supplying heat to said flue means, said flue means being interconnected at said first end with said heat supplying means, said heat supplying means causing said flue means to heat said liquid to enhance vaporization;

means attached to said container for mixing air with said vapor, said mixing means including a first opening in the top portion of said container and a floating baffle attached to said top portion of said container, said baffle having a second opening therethrough for directing the flow of air passed the top surface of the liquid;

means attached to said container for drawing an exhausting said vapor and air from the inside of said container, said drawing and exhausting means including a vent structure having a generally hollow interior, said vent structure being suitably connected to said container so as to define a passageway from said container to the atmosphere, said second end of said flue means being disposed near said passageway defined by said vent structure, said passageway having a larger diameter than the second end of said flue means so as to define a space between said passageway and the second end of said flue means whereby the vapor and air are aspirated into the passageway through the space and mixed with the hot gases emitted from said flue means toward said passageway;

a trough attached inside said container, said trough having a side somewhat above said liquid when said container is operably filled with said liquid;

means for draining said trough to the outside of said container whereby the insoluble substances tend to float and bubble into said trough as said water boils and vaporizes thereby providing for separation and removal of the insoluble substances from said apparatus;

means for sensing temperature at a location just above the first end of said flue means; and means interconnected with said temperature sensing means to turn off said heat supplying means when said temperature sensing means senses a predetermined temperature whereby said temperature sensing means senses the predetermined temperature when evaporation reduces liquid level sufficiently to bring the insoluble substances into contact with said temperature sensing means thereby causing said turn off means to function to prevent the liquid level from decreasing further to prevent the insoluble substances from contacting said flue means near the heat supplying means.

* * * * *

UNITED STATES PATENT AND TRADEMARK OFFICE
CERTIFICATE OF CORRECTION

PATENT NO. : 4,534,828

DATED : August 13, 1985

INVENTOR(S) : Dale C. Erickson et al.

It is certified that error appears in the above-identified patent and that said Letters Patent is hereby corrected as shown below:

INID Code 73, delete "Blane" and insert -- Blaine --.

Column 9, line 6, "passed" should be -- past --.

Column 10, line 25, "passed" should be -- past --.

Column 10, line 27, "an" should be -- and --.

Column 6, line 58, "horizontally" should be -- horizontal --.

Signed and Sealed this

Thirteenth Day of May 1986

[SEAL]

Attest:

Attesting Officer

DONALD J. QUIGG

Commissioner of Patents and Trademarks